United States Patent
Fielding et al.

(10) Patent No.: US 10,455,113 B1
(45) Date of Patent: Oct. 22, 2019

(54) DOCUMENT CLASSIFICATION UTILIZING FLUORESCENT OR ULTRAVIOLET INKING

(71) Applicant: RIPCORD INC., Hayward, CA (US)

(72) Inventors: Alex Fielding, Hayward, CA (US);
Kevin C. Hall, Hayward, CA (US);
Kirk H. Knight, Hayward, CA (US)

(73) Assignee: RIPCORD INC., Hayward, CA (US)

( * ) Notice: Subject to any disclaimer, the term of this patent is extended or adjusted under 35 U.S.C. 154(b) by 0 days.

(21) Appl. No.: 15/383,395

(22) Filed: Dec. 19, 2016

Related U.S. Application Data (60) Provisional application No. 62/233,956, filed on Dec. 19, 2015.

(51) Int. Cl.
| | |
|---|---|
| *H04N 1/32* | (2006.01) |
| *H04N 1/00* | (2006.01) |
| *G06K 15/10* | (2006.01) |
| *B41J 2/21* | (2006.01) |

(52) U.S. Cl.
CPC ........ *H04N 1/32352* (2013.01); *B41J 2/2107* (2013.01); *G06K 15/102* (2013.01); *H04N 1/00347* (2013.01); *H04N 1/32149* (2013.01); *H04N 2201/0081* (2013.01); *H04N 2201/327* (2013.01); *H04N 2201/3271* (2013.01)

(58) Field of Classification Search
CPC ............. H04N 1/32352; H04N 1/32149; B41J 2/2107; G06K 15/102
See application file for complete search history.

(56) References Cited

U.S. PATENT DOCUMENTS

| | | | |
|---|---|---|---|
| 6,330,976 B1 | 12/2001 | Dymetman et al. | |
| 6,373,965 B1 | 4/2002 | Liang | |
| 6,644,764 B2 | 11/2003 | Stephens et al. | |
| 6,839,128 B2 | 1/2005 | Premjeyanth et al. | |
| 7,213,757 B2 | 5/2007 | Jones et al. | |
| 7,694,887 B2 | 4/2010 | Jones et al. | |
| 2002/0063744 A1* | 5/2002 | Stephens, Jr. .......... | G06K 1/121 347/19 |
| 2003/0032033 A1 | 2/2003 | Anglin et al. | |
| 2007/0188810 A1* | 8/2007 | Nakagama ......... | H04N 1/00037 358/2.1 |
| 2014/0236978 A1* | 8/2014 | King ................. | G06F 17/30637 707/758 |

OTHER PUBLICATIONS

Superior Case Coding. UV Readable Ink Coding. Available at http://www.superiorcasecoding.com/uv-readable-ink-coding.shtml. Accessed on Jan. 5, 2017.

* cited by examiner

*Primary Examiner* — Christopher Wait
(74) *Attorney, Agent, or Firm* — Wilson Sonsini Goodrich & Rosati (57) ABSTRACT

Systems and methods are provided for document classification and digitization. One or more physical documents may have a classification code applied thereon. The classification code may be a unique identifier for the document and/or page of the document. The classification code may utilize ink outside the visible spectrum for the purpose of being machine readable. A digital version of the physical document may be created. The digital version may include a visible reproduction of the document without showing the classification code.

18 Claims, 5 Drawing Sheets

DOCUMENT CLASSIFICATION UTILIZING FLUORESCENT OR ULTRAVIOLET INKING

CROSS-REFERENCE

This application claims the benefit of U.S. Provisional Application No. 62/233,956, filed Dec. 19, 2015, which application is incorporated herein by reference in its entirety.

BACKGROUND OF THE INVENTION

Traditional methods of labeling and identifying various documents include applying visible marks on the documents. For instance, the legal, medical, and business fields, often use Bates numbering to mark legal documents. The use of traditional visible inks to mark documents may result in overprinting important and sensitive information. For examples handwritten notes in the margins of documents may be overprinted by the labels and may no longer be legible.

SUMMARY OF THE INVENTION

A need exists to add labels for documents without blocking underlying printed content. For instance, a need exists to add a unique identifier code to documents that may be human or machine readable without blocking the underlying content.

Systems and methods are provided for document classification and digitization. One or more documents may be marked with a classification code. The classification code may be applied on the documents using an ink that is not visible to the naked eye under natural light conditions. The classification code may include information about the document, timing information, and/or page information. The documents may be digitized by being scanned in. The documents may be scanned so that the documents are digitized without showing the classification code on the digital document. The information on the classification code may be associated with the digital document.

An aspect of the invention is directed to a method of document classification, said method comprising: receiving, at a classification station, a physical document comprising one or more pages; applying, at the classification station, a classification code to the physical document, wherein the classification code is formed using an ink that is not visible to the unaided eye when viewed under natural light; and scanning the physical document into a digital format, wherein the classification code is not visible in the digital format.

In some embodiments, the method may further comprise associating information from the classification code with the digital format of the physical document, within a memory. The information from the classification code may include one or more of the following: a unique identifier for each of the one or more pages, timing at which the classification code is applied to the physical document, or timing at which the physical document is received at the classification station. The method may further comprise: illuminating the physical document under light that includes wavelengths outside the visible spectrum; capturing an image of the classification code that is visible under the light that includes wavelengths outside the visible spectrum; and determining the information from the classification code based on the image.

The physical document may be formed of one or more of the following: card stock, file folders, cardboard, acetate film, polyester film, synthetic paper, microfiche, tissue paper, X-ray film, blueprints, maps, cloth, or parchment. The ink may be an ultraviolet ink that is visible when viewed under ultraviolet light. The classification code may be applied with aid of an ink jet printer. The classification code may follow a Bates numbering system.

Further aspects of the invention may be directed to an assembly for document digitization and classification, said assembly comprising: a classification station configured to (1) receive a physical document comprising one or more pages, and (2) apply a classification code to the physical document, wherein the classification code is formed using an ink that is not visible to the unaided eye when viewed under natural light; and a scanning station configured to scan the physical document into a digital format, wherein the classification code is not visible in the digital format.

In some embodiments, the assembly may further comprise a conveyance mechanism that permits the physical document to be conveyed from the classification station to the scanning station without human intervention. The classification station, the scanning station, and the conveyance mechanism may operate in concert without human intervention. The classification station or the scanning station may be configured to accommodate a plurality of types of physical documents without human intervention, wherein the plurality of types of physical documents include two or more of the following: card stock, file folders, cardboard, acetate film, polyester film, synthetic paper, microfiche, tissue paper, X-ray film, blueprints, maps, cloth, or parchment. The assembly may further comprise a clock, wherein information from the classification code comprises timing information provided by the clock. Optionally, the assembly may further comprise an illumination source that illuminates the physical document under light that includes wavelengths outside the visible spectrum, wherein the classification station applies the classification code to the physical document after the illumination source illuminates the physical document when the illumination reveals that the physical document does not already have, applied thereon, a classification code formed of an ink that is not visible to the unaided eye.

A method of document classification may be provided in accordance with additional aspects of the invention. The method may comprise: receiving, at a classification station, a physical document comprising one or more pages; applying, at the classification station, a classification code to the physical document, wherein the classification marker is formed using an ink that is not visible to the unaided eye when viewed with natural light illumination, and wherein the classification code includes timing information relating to an event associated with the physical document; and scanning the physical document into a digital format.

In some embodiments, the event associated with the physical document is when the physical document is received at the classification station. The event associated with the physical document may be a moment when the classification code is applied to the physical document. The timing information may have a degree of precision that is greater than or equal to a minute of precision. The classification code may follow a Bates numbering system. The classification code may be applied to each of the one or more pages of the physical document.

Additional aspects and advantages of the present disclosure will become readily apparent to those skilled in this art from the following detailed description, wherein only exemplary embodiments of the present disclosure are shown and described, simply by way of illustration of the best mode contemplated for carrying out the present disclosure. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

While preferable embodiments of the invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

The invention provides systems and methods for document classification and digitization. Various aspects of the invention described herein may be applied to any of the particular applications set forth below. The invention may be applied as a document classification station or may be part of an integrated document digitization system or service. It shall be understood that different aspects of the invention can be appreciated individually, collectively or in combination with each other.

It may be desirable to provide a label to documents, particular for legal, medical, or business documents. The label may be used to identify and/or classify the documents. In some instances, the label may provide a verification of the document identity. The label may be a classification code that may include timing information relating to an event associated with the document, such as when the classification code is added to the document, or when the document is received. The classification code may be printed onto the document using an invisible ink that is not visible to the naked eye under natural light. This may allow the classification code to be added without overprinting or obscuring parts of the document under the classification code.

The document may scanned and converted into a digital format. It may be desirable to prepare previously printed-paper records for digital storage. Digitized versions of documents may take up less space and be accessed remotely from various locations. The digitized version of the documents may be created to provide high resolution and good quality digital versions of the physical documents. The digitized version of the documents may be reproduced without showing the classification code. This may prevent the classification code from obscuring parts of the digital document. Information relating to the classification code may be associated with the digital documents. Thus, information relating to the classification code may be accessible in association with the digital documents.

Figure 1:
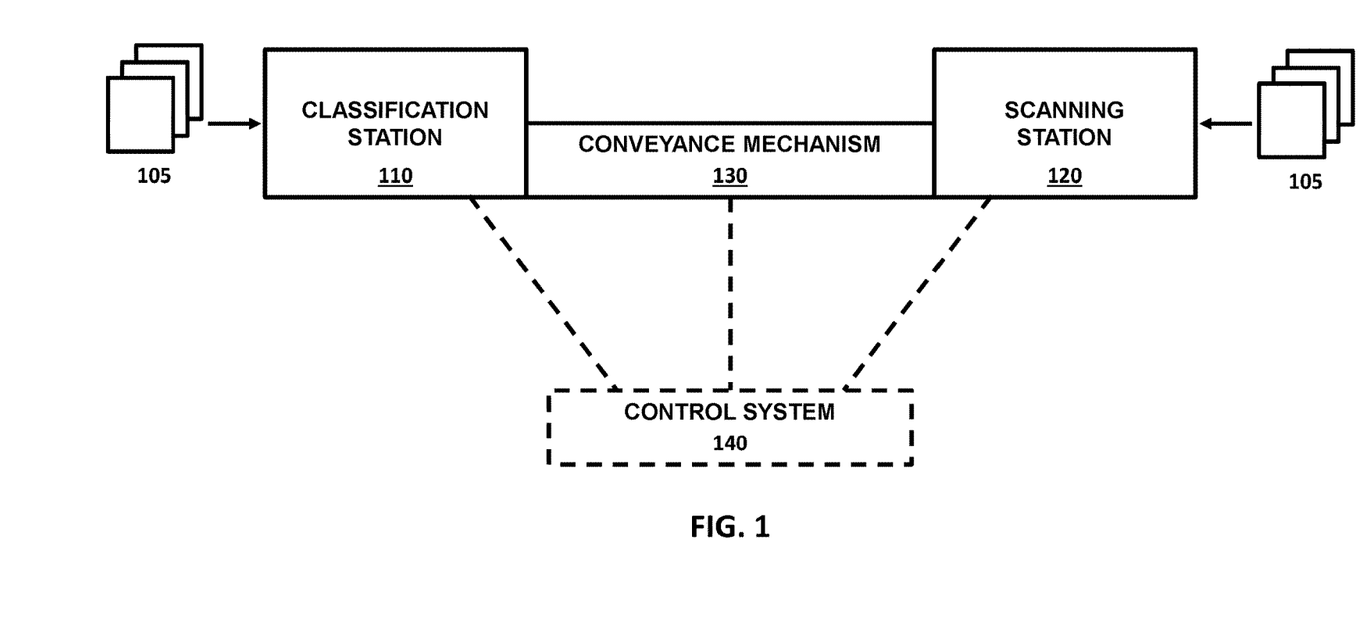
FIG. 1 provides an illustration of a document classification and digitization system in accordance with an embodiment of the invention.

FIG. 1 provides an illustration of a document classification and digitization system in accordance with an embodiment of the invention. The system may include a classification station 110, a scanning station 120 and/or one or more conveyance mechanisms 130 that may permit automated conveyance between the classification station and the scanning station. Optionally, a control system 140 may be in communication with the classification station, the scanning station, and/or the conveyance mechanism. One or more documents 105 may be provided to the classification and digitization system to have a classification code applied thereon, and to be digitized.

The one or more documents 105 may include one or more pages. The one or more pages may be secured to one another with aid of a fastener, or may be provided in a stack without requiring a fastener. The one or more pages may be of the same media type (e.g., the same type of paper, etc.), or may be of different media types from one another. The one or more pages may have the same dimensions or may have different dimensions (e.g., letter size, legal size, envelopes, index cards, etc.). The one or more pages may have pages with the same orientation (e.g., portrait, landscape) or alignment, or differing orientations or alignments.

The one or more documents may be formed of one or more media types. The document classification and digitization system may be able to accommodate flexible media types. For instance, the document classification and digitization system may be able to accommodate multiple media types. The system may accommodate multiple media types without requiring human intervention. Examples of media types may include paper, card stock, file folders, cardboard, acetate film, polyester film, synthetic paper, microfiche, tissue paper, X-ray film, blueprints, maps, cloth, parchment, and so forth. Documents may include tabs, post-its, labels, dividers, or other types of media. Document content may include text, numbers, images, and so forth. A single document may comprise one, two, three, four, five or more different media types, such as those described herein. Multiple documents may collectively comprise one, two, three, four, five or more different media types, such as those described herein. Individual documents of the plurality of documents may comprise the same or different media types relative to one another. One or more components of the document classification and digitization system may be configured to accommodate a plurality of media types, a plurality of document dimensions, and/or a plurality of page orientations. The one or more components of the document classification and digitization system may make such accommodations without requiring any human intervention. The various documents may be provided to the system, and the system may automatically be able to handle the various types of documents.

The one or more physical documents may be provided to the classification and digitization system to create a digital version of the physical documents. This may advantageously allow a user to access the digital versions of the physical documents from remote locations. The digital versions of the physical documents may also take up less space and be less susceptible to physical degradation.

In some embodiments, it may be desirable to provide a classification code to the physical document. The classification code may be used to verify the identity of the document and/or provide additional information relating to the document. In some instances, the classification code may be provided to every page of the document. Alternatively, one or more selected pages of the physical document may receive a classification code.

A classification station 110 may receive the one or more documents. The classification station may apply a classification code to the one or more documents. Optionally, the classification station may verify that the one or more documents does not already have a classification applied thereon, before applying the classification code. If there is already a classification code on the document, the classification station may bypass providing an additional classification code. Alternatively, the classification station may provide an additional classification code. The additional classification code may be provided a location different from the existing classification code, which may prevent the additional classification code from overwriting the existing classification code. If no prior classification code is on the document, the classification station may apply a classification code on the document.

The classification code may be provided using an invisible ink. The classification code may not be visible to the naked eye under natural illumination. Invisible ink may include ink that is not visible to the unaided eye when viewed under natural light (e.g., light from the sun). Invisible ink may include ink that is not visible to the unaided eye when viewed under conventional incandescent bulbs. The invisible ink may include ink that visible to the unaided eye when viewed under white light. The invisible ink may be colorless under natural illumination, or the various illumination conditions described. The classification code may not be visible when viewed under the visible range of electromagnetic radiation. The classification code may not be visible to the naked eye when viewed under light having a wavelength within 400-700 nm.

The classification code may be printed on the document with aid of an inkjet printer. The invisible ink may be an ultraviolet (UV) ink. The UV ink may be visible when viewed under ultraviolet radiation. The invisible ink may be a fluorescent ink. The invisible ink may emit electromagnetic radiation at a different wavelength from the electromagnetic radiation that hits the ink. The ink may be visible when exposed to x-ray radiation, ultraviolet radiation, infrared radiation (e.g., far red (FR) or near infrared (NR)), or terahertz radiation. The ink may be visible when exposed to radiation having a wavelength less than or equal to 200 nm, 300 nm, 350 nm, 400 nm, 425 nm, 450 nm, 475 nm, or 500 nm. The ink may be visible when exposed to radiation having a wavelength greater than or equal to 650 nm, 675 nm, 700 nm, 725 nm, 750 nm, 800 nm, 850 nm, 900 nm, 1000 nm, or 1200 nm. The ink may become visible under such conditions to the unaided eye, and/or may become visible with aid of auxiliary observation equipment.

The ink may glow faintly (i.e., fluoresce) when under a light source that includes wavelengths outside the visible spectrum (e.g., UV lamp). Alternatively, the ink may absorb light from a light source that includes wavelengths outside the visible spectrum (e.g., UV lamp) without fluorescing. Such ink may be provided on a background that may fluoresce. The ink may have a formulation that may include a component of laundry detergents (e.g., including optical brighteners), soap, sunscreen, or lemon juice).

The classification station may provide the classification code to one or more pages of the physical documents without requiring human intervention. For instance, a plurality of documents and/or pages may be provided to the classification station, and the classification station may apply the classification code in an automated manner. The classification station may be capable of providing the classification code in the automated manner even when the documents and/or pages are of different media types, dimensions, and/or orientations. The classification station may access an individual page from the one or more pages, align the page in a desired manner, and print the classification code on the page. The classification may access a subsequent page from the one or more pages, align the subsequent page in a desired manner, and print a classification code on the subsequent page. This process may be repeated until all a classification code has been added to each page. The classification code may be unique so that no two pages have the exact same classification code.

One or more documents may be provided to a scanning station 120. The scanning station may digitize the one or more documents. For instance, each page of the one or more documents may be scanned into a digital format. Optionally, a single side of the one or more pages is scanned into a digital format. Alternatively, multiple sides of the one or more pages can be scanned into a digital format. In some embodiments, the pages may be scanned with high resolution. The pages may be scanned with a 300 pixel, 600 pixel, 1200 pixel, 2400 pixel, or 4800 pixel resolution or greater. The pages may be scanned in black and white, grayscale, or color.

One or more of the physical pages to be scanned may have a classification code provided thereon. In some instances, each of the physical pages to be scanned may have a classification code provided thereon. The classification code may be invisible while the physical pages are being scanned. Digital versions of the physical pages may be created. The digital versions may not have the classification code visible thereon. In some embodiments, at least a clean version of the document may be digitized, where the classification code is not visible.

The digital versions may be stored in memory. The memory may be a local memory of the scanning station and/or the classification and digitization system. Alternatively, the memory may be external to the classification and digitization system. In some embodiments, the memory may be provided in a cloud computing format. The digital versions of the documents may be viewed locally or from a remote location. Information pertaining to the classification code may be associated with the digital versions of the document. For example, information relating to a classification code of a page that has been digitized may be associated with the digitized version of the page. The information relating to the classification code may be stored in memory. The information relating to the classification code may be stored in the same memory as the digitized version of the associated page. The information relating to the classification code may be viewable when viewing the digitized version of the associated page, while the classification code may optionally not be viewable itself.

The information relating to the classification code may include the information shown on the classification code. The information relating to the classification code may include a page number of the associated page. The information relating to the classification code may include timing information (e.g., time of creation of the classification code). The information relating to the classification code may include information about the document (e.g., document number, name, type, etc.).

The scanning station may be at a different physical location than the classification station. Alternatively, the classification station and the scanning station may be incorporated at the same physical location. The one or more documents may be conveyed between the classification and scanning station. Alternatively, the one or more documents need not move to be accessed by the classification station and the scanning station.

In some embodiments, additional stations may be provided between the classification station and the scanning station. Additional stations may optionally further process the documents further. Alternatively, no additional stations are provided between the classification station and the scanning station.

In some embodiments, one or more documents may be transferred from the classification station to the scanning station with aid of a conveyance mechanism 130. The conveyance mechanism may transfer each page of the document individually and separately. Alternatively, the conveyance mechanism may transfer the entirety of the document at a time. The conveyance mechanism may receive the document/page from the classification station and provide the document/page to the scanning station, optionally without any human intervention. A classification and digitization process may be automated so that human interaction is not required.

In some instances, the conveyance mechanism may utilize gravity and/or friction to transfer the documents/pages. In one example, the conveyance mechanism may be a conveyer belt. The conveyance mechanism may utilize one or more robotic arms in transferring the documents/pages. The conveyance mechanism may utilize positive or negative pressure to transfer the documents/pages. The conveyance mechanism may utilize suction to aid in transferring the documents/pages. The conveyance mechanism may utilize ground autonomous robots to aid in transferring documents/pages. The conveyance of the document (e.g., destination, speed, conveyance mode) may or may not depend on information provided in the classification code.

In some embodiments, a control system 140 may be provided. The control system may communicate with the communication station 110, scanning station 120, and/or the conveyance mechanism 130. The control system may comprise one or more processors that may obtain data and/or generate instructions to control the communication station, scanning station, and/or conveyance mechanism. The control system may comprise memory comprising tangible computer readable media which may comprise code, logic, or instructions for performing one or more steps described elsewhere herein. The one or more processors may execute the one or more steps.

The control system may optionally control the communication station, scanning station, and/or conveyance mechanism in concert. In one example, the control system may receive information from the classification station, which may be useful in controlling the conveyance mechanism and/or the scanning station. The control system may receive information from one or more of the classification station, scanning station, and/or conveyance mechanism that may be useful for controlling the classification station, the scanning station, and/or the conveyance mechanism, or any other part of the classification and digitization system.

In some embodiments, the system may also include a document destruction station. The document destruction station may destroy a physical document. In some instances, the document destruction station may put the physical document into a form that may be illegible. One example of a document destruction station may comprise a shredder. In other examples, the document destruction station may comprise fire or a heating element that may burn the physical document. A document destruction station may be separate from a scanning station. Alternatively, the document destruction station and the scanning station may be incorporated at a single location. In some instances, no document destruction station is provided in the system.

Alternatively, physical documents may be saved after scanning. The classification code may remain on the physical documents after scanning. The classification code may be viewable under selected light conditions after scanning. The physical documents may be stored in one or more containers (e.g., boxes, crates, etc.) after scanning. The physical documents may be transferred and stored in the one or more containers in an automated fashion without requiring human intervention.

Figure 2:
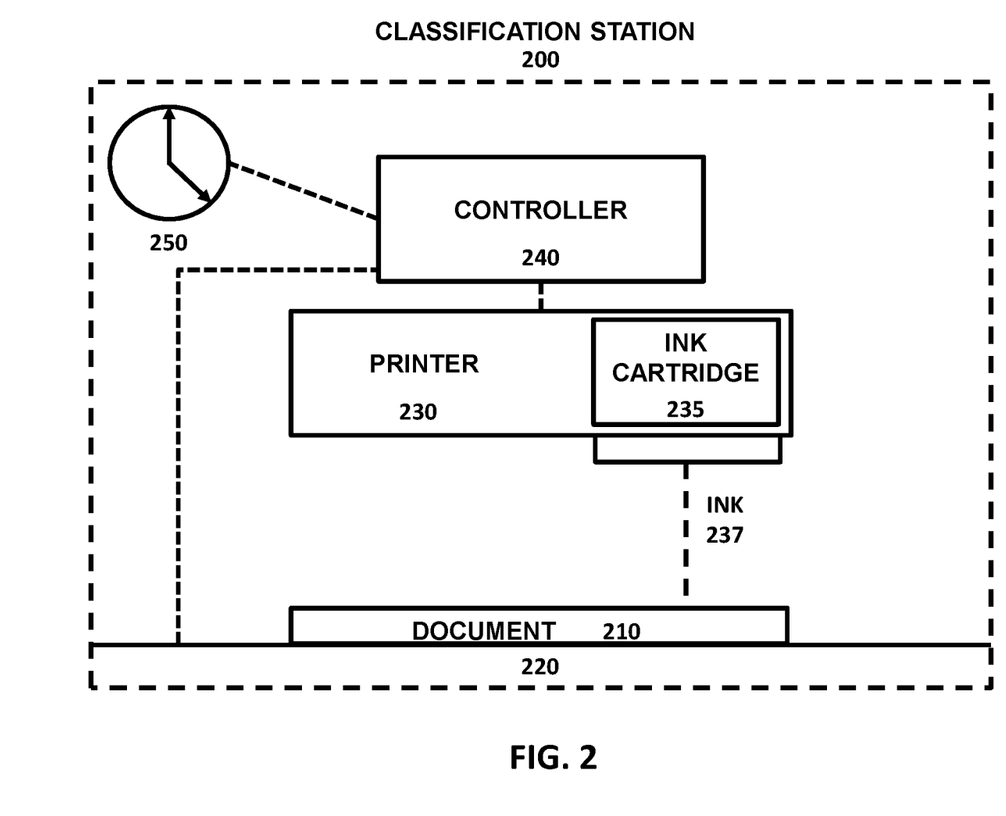
FIG. 2 shows a schematic of a classification station in accordance with an embodiment of the invention.

FIG. 2 shows a schematic of a classification station 200 in accordance with an embodiment of the invention. The classification station may be configured to receive a document 210. In some embodiments, the document may be supported in the classification station with aid of a support structure 220. A classification code may be applied to the document. The classification code may be applied with aid of a printer 230. The printer may include an ink cartridge 235. The ink 237 may be applied to the document. The ink may be invisible ink. Optionally, a controller 240 of the classification station may communicate with one or more other components of the classification station. In some embodiments, a clock 250 may be provided in the classification station.

A physical document 210 may be provided to the classification station. The physical document may include one or more pages. In some embodiments, a single page may be presented at a time, or multiple pages may be presented at a time. A single document may be presented at a time or multiple documents may be presented at a time. The classification station may receive one or more pages of one or more physical documents in an automated fashion. As previously described, the one or more pages may be of the same media time or different media types, the same dimensions or different dimensions, the same orientation or different orientations. The physical document may be brought to a desired location and/or alignment in the classification station. The physical document may or may not have a fastener connecting multiple pages of the document when received at the classification station. Optionally, if a fastener is provided, the fastener may be removed before the classification code is applied to the document.

In some embodiments, the classification station may include a support structure 220 that may support the physical document. The support structure may hold the document while the classification code is being applied to the document. In some embodiments, the support structure may aid in moving the physical document to a desired location and/or alignment. For example, the support structure may comprise a conveyer belt and/or a robotic arm that may aid in manipulating the physical document. Alternatively, the support structure may be stationary and may be configured to receive the document that may be manipulated to the support structure manually or with aid of robotic features. The support structure may utilize gravity and/or friction in supporting the physical document. The support structure may optionally use positive or negative pressure in supporting the physical document. For example, the support structure may use suction in supporting the physical document.

The classification station may cause a classification code to be applied to the document. The classification code may be printed with a photomechanical process. Evaporation of solvents may not be required in printing the classification code. In some embodiments, the classification code may be applied with aid of a printer 230. The printer may be an inkjet printer. In alternative embodiments, the classification code may be applied through evaporation of solvents. The classification station may be capable of printing a classification code on different types of media, such as porous or non-porous media. Invisible ink may be applied to a porous media, such as paper, or a non-porous media, such as film.

A printer 230 may comprise an ink cartridge 235 that may store the ink therein. The ink cartridge may be removable and/or replaceable. The ink cartridge may store invisible ink. As previously described, the invisible ink may comprise ink that is not visible to the unaided eye under natural lighting conditions or conventional lighting conditions. The invisible ink may be visible in the electromagnetic spectrum at wavelengths that are shorter or longer than visible light. The invisible ink may be an ultraviolet ink or fluorescent ink. The invisible ink may have any characteristics of ink described elsewhere herein.

The printer 230 may comprise a printhead. The printhead may be useful for transferring ink 237 from the ink cartridge 235 to the physical document 210. The printer may be capable of printing the classification code with a high degree of precision and accuracy. The printer may be capable of printing the classification code at a high resolution. For example, the printer may be capable of printing the classification code at 300 dpi, 400 dpi, 600 dpi, 900 dpi, 1200 dpi, 2400 dpi, or 4000 dpi or greater. The ink may be applied to various types of media at the various resolutions described. For instance, both porous and non-porous media may be capable of receiving the classification code in invisible ink at any of the dpi described.

The physical document may remain substantially stationary while the classification code is printed on the document. Alternatively, the physical document may be movable while the classification code is printed. The document may be positioned beneath the printer while the classification code is printed. Any description herein of the document may apply to a single page of the document or multiple pages of the document.

In some embodiments, the document may have material on a single side of each page. Alternatively, the document may be double sided. The classification code may be applied to a single side of each document page. Alternatively, the classification code may be applied to each side of the document page. A support structure 220 or any other structure within the classification station may aid in manipulating the physical document pages to allow the classification code to be printed on both sides of the document pages when the document is double sided. For example, a structure within the classification station may cause the document to be flipped in an automated fashion to enable printing on both sides of the document page. For example, a document page may be received at a classification station with a first side up. A classification code may be printed onto the first side. Then document may be flipped (e.g., in an automated fashion without requiring human intervention) so that the second side is up. A classification code may be printed on the second side. Printing the classification code in invisible ink may also advantageously prevent any visible bleed-through of ink for double sided documents. This may be useful when the document may be converted to a digital format.

The classification station may optionally include a clock 250. The clock may refer to any type of time-keeping mechanism. In alternative embodiments, a local clock need not be provided on-board the classification. Timing information may be provided to the classification station from a source external to the classification station. Any description herein of a clock on-board the classification station may apply to a source of timing data off-board the classification station.

Information from the clock may be useful in controlling the printer. For example, the classification code may include timing information. The classification code printed on the document may include timing information associated with an event of the document. For example, the event related to the document may be when the document is received at the classification station. The event related to the document may be when the document is received at the classification and digitization system. The event related to the document may be when the classification code is printed on the document page. In some embodiments, an entirety of the document may have the same timing information on its classification code. For example, if the document is received on a particular date and/or time, the same date and/or time may be provided in the classification code printed on the document. Alternatively, each page of the document may have different timing information on their respective classification codes. For example, if each page has the classification code printed on it at a different time, that time may be provided on the classification code printed on the page.

The clock may tell time with any degree of precision. For instance, the clock may tell time to the year, month, date, hour, minute, seconds, tenth of a second, hundredth of a second, or milliseconds. The classification code may include timing information that may have any degree of precision. The classification code timing information may be to the year, month, date, hour, minute, seconds, tenth of a second, hundredth of a second, or milliseconds. In some embodiments, the timing information on the classification code may be to a lower degree of precision than the clock is capable of providing. Alternatively, the timing information on the classification code may be to the same degree of precision that the clock is capable of providing.

A controller 240 may be in communication with one or more components of the classification station. The controller may communicate with the support system 220, the printer 230, and/or the clock 250. The controller may comprise one or more processors that may obtain data and/or generate instructions to control the support system, the printer, and/or the clock. The controller may comprise memory comprising tangible computer readable media which may comprise code, logic, or instructions for performing one or more steps described elsewhere herein. The one or more processors may execute the one or more steps.

The controller may optionally control the support system, the printer, and/or the clock in concert. In one example, the controller may receive information from the clock, which may be useful in controlling the printer. The controller may receive information from one or more of the clock, support structure, and/or printer that may be useful for controlling the clock, support structure, and/or printer, or any other part of the classification station.

A classification station may or may not include a housing. The housing may partially or completely enclose one or more component of the classification station. For example, the housing may partially or completely enclose the document while the classification code is applied to the document. The housing may partially or completely enclose the printer.

Figure 3:
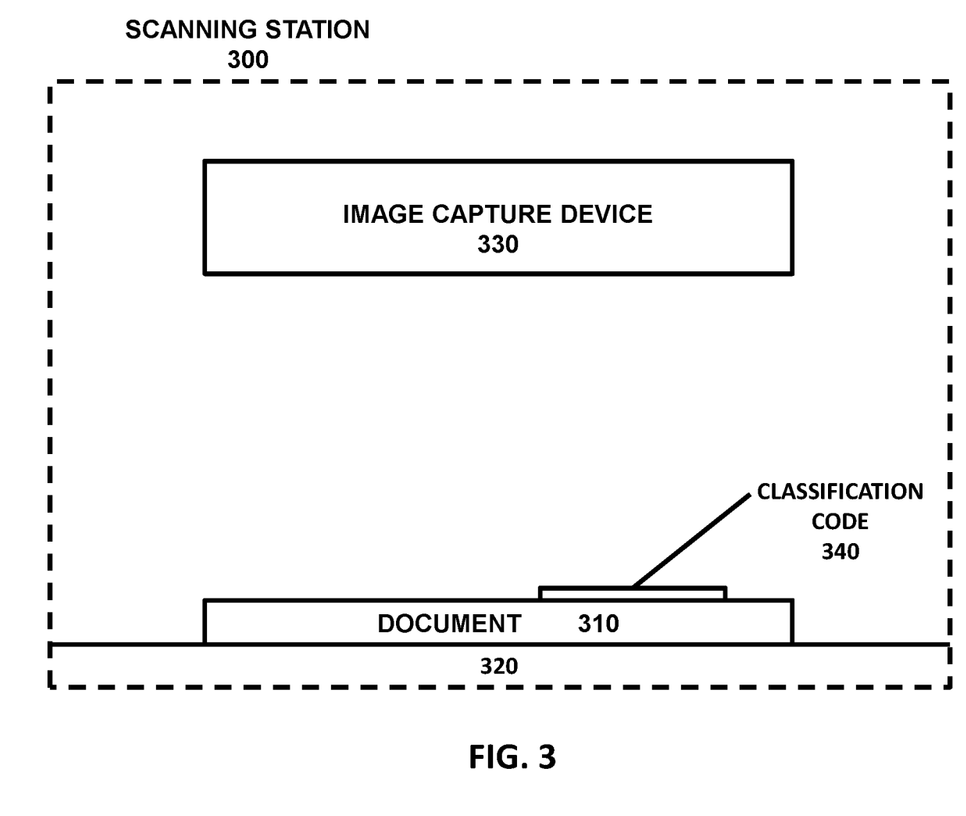
FIG. 3 shows a schematic of a scanning station in accordance with an embodiment of the invention.

FIG. 3 shows a schematic of a scanning station 300 in accordance with an embodiment of the invention. The scanning station may be configured to receive a document 310. In some embodiments, the document may be supported in the classification station with aid of a support structure 320. A classification code 340 may be applied to the document. The classification code may be provided in an invisible ink prior to the document arriving at the scanning station. Alternatively, the classification code may be provided at a classification station that may be integrated with the scanning station. An image capture device 330 may be used to capture a digital image of the physical document. Optionally, a controller of the scanning station may communicate with one or more other components of the scanning station.

A physical document 310 may be provided to the scanning station. The physical document may include one or more pages. In some embodiments, a single page may be presented at a time, or multiple pages may be presented at a time. A single document may be presented at a time or multiple documents may be presented at a time. The scanning station may receive one or more pages of one or more physical documents in an automated fashion. As previously described, the one or more pages may be of the same media time or different media types, the same dimensions or different dimensions, the same orientation or different orientations. The physical document may be brought to a desired location and/or alignment in the scanning station. The physical document may or may not have a fastener connecting multiple pages of the document when received at the scanning station. Optionally, if a fastener is provided, the fastener may be removed before the physical document is imaged and a digital version of the document is formed.

In some embodiments, the scanning station may include a support structure 320 that may support the physical document. The support structure may hold the document while the image of the physical document is being captured. In some embodiments, the support structure may aid in moving the physical document to a desired location and/or alignment. For example, the support structure may comprise a conveyer belt and/or a robotic arm that may aid in manipulating the physical document. Alternatively, the support structure may be stationary and may be configured to receive the document that may be manipulated to the support structure manually or with aid of robotic features. The support structure may utilize gravity and/or friction in supporting the physical document. The support structure may optionally use positive or negative pressure in supporting the physical document. For example, the support structure may use suction in supporting the physical document.

The scanning station may cause a digital version of the physical document to be created. An image capture device 330 may aid in creating the digital version of the document. Any description herein of a scanning station may apply to any type of station where a digital version of the document is created, whether a scanning technique is used, or an image of the entire document is captured contemporaneously. Any description herein of the image capture device may apply to any type of device that may aid in digitizing the document.

In one example, the scanning station may utilize image scanning techniques to digitize the document. The document may be scanned pixel by pixel or row by row. In some embodiments, a drum scanner, flatbed scanner (e.g., CCD scanner, CIS scanner), film scanner, or roller scanner may be employed to aid in digitizing the document. The physical document may remain substantially stationary while being scanned. Alternatively, the physical document may be movable while being scanned.

In another example, the scanning station may utilize a camera to digitize the document. The entirety of each page of the document may be imaged contemporaneously. In some embodiments, CCD camera may be employed to aid in digitizing the document. A digital camera may be utilized to image the documents. In some embodiments, the camera may be capable of imaging the document at a high resolution (e.g., 1 MP, 2 MP, 3 MP, 4 MP, 6 MP, 8 MP, 10 MP, 15 MP, 20 MP, 30 MP, 40 MP, or 50 MP or greater). The physical document may remain substantially stationary while being imaged. Alternatively, the physical document may be movable while being imaged.

Any description herein of the document may apply to a single page of the document or multiple pages of the document.

In some embodiments, the document may have material on a single side of each page. Alternatively, the document may be double sided. The classification code on a single side of each document page. Alternatively, the classification code may be on each side of the document page. A support structure or any other structure within the scanning station may aid in manipulating the physical document pages to allow both sides of the document to be imaged when the document is double sided. For example, a structure within the scanning station may cause the document to be flipped in an automated fashion to enable imaging of both sides of the document page. For example, a document page may be received at a scanning station with a first side up. The first side of the document may be imaged. Then document may be flipped (e.g., in an automated fashion without requiring human intervention) so that the second side is up. The second side of the document may be imaged.

The digital version of the document may be a 'clean' version of the document that does not show the classification code 340. The image of the document may be captured in natural light. The image of the document may be captured under the illumination of light in the visible spectrum. The image of the document may be captured using light between 400-700 nm. The image of the document may be captured only using light having wavelengths between any two of the wavelength values provided elsewhere herein. The image of the document may be captured without using UV, FR, or IR radiation. The image of the document may be captured while the classification code is invisible. This may advantageously allow the document to be provided in a digital format without having the classification code overprint or obscure any of the original features of the document.

In some embodiments, information relating to the classification code may be associated with the document. The information relating to the classification code may be associated with the digitized version of the document in a memory. The information relating to the classification code may be provided from the classification code which used the information relating to the classification code to control the printer to print the classification code. Alternatively or in addition, information relating to the classification code may be collected from the classification code on the physical document. For example, the physical document may be illuminated under light outside the visible spectrum and an image of the classification code may be captured. Optical character recognition (OCR) techniques may be employed to obtain the information relating to the classification code.

A controller may be in communication with one or more components of the scanning station. The controller may communicate with the support system 320, and/or the image capture device 330. The controller may comprise one or more processors that may obtain data and/or generate instructions to control the support system and/or the image capture device. The controller may comprise memory comprising tangible computer readable media which may comprise code, logic, or instructions for performing one or more steps described elsewhere herein. The one or more processors may execute the one or more steps.

The controller may optionally control the support system and/or the image capture device in concert. In one example, the controller may receive information from the support structure about placement of the document, which may be useful in controlling the image capture device. The controller may receive information from one or more of the support structure, and/or the image capture device that may be useful for controlling the support structure, the image capture device, or any other part of the scanning station.

A scanning station may or may not include a housing. The housing may partially or completely enclose one or more component of the scanning station. For example, the housing may partially or completely enclose the document while the document is being digitized. The housing may partially or completely enclose the image capture device.

Figure 4:
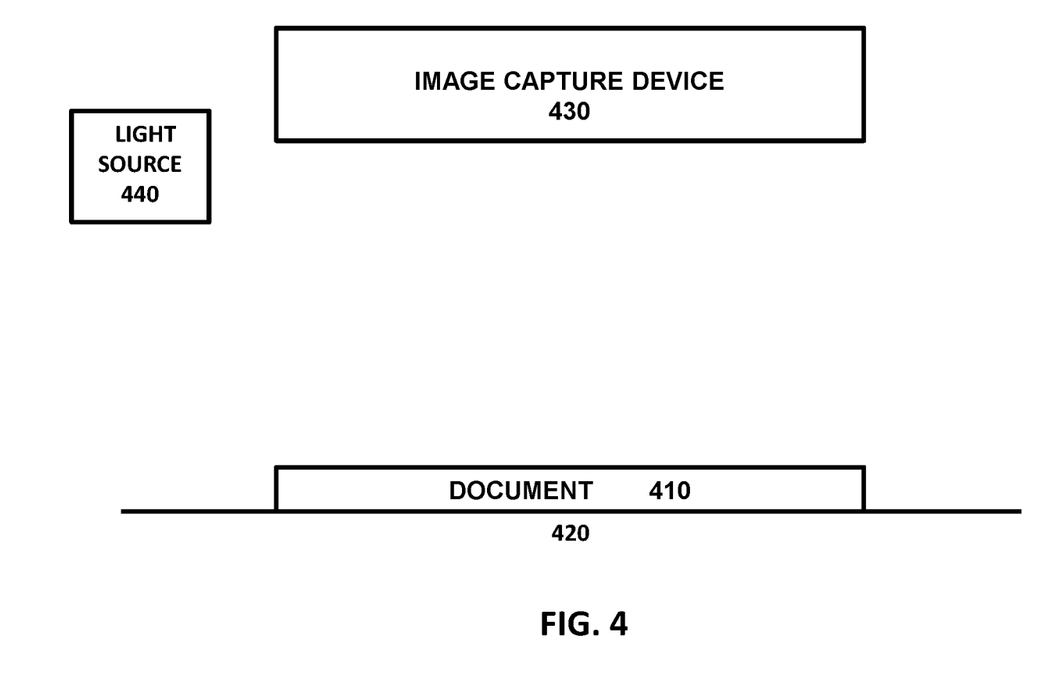
FIG. 4 shows an arrangement that may be used to view a classification code on a document in accordance with an embodiment of the invention.

FIG. 4 shows an arrangement that may be used to view a classification code on a document in accordance with an embodiment of the invention. The arrangement to view the classification code on the document 410 may include a support structure 420 that may be used to support the document. An image capture device 430 may be used to capture a digital image of the physical document. A light source 440 may be provided that may illuminate the document using wavelengths outside the visible range. If a classification code is present on the document, the light source may cause the classification code to become visible and detectable by the image capture device.

The arrangement to view the classification code may be part of a classification station and/or a scanning station. Alternatively, the arrangement to view the classification code may be at a separate location from the classification station and the scanning station.

When the arrangement to view the classification code is part of a classification station, the light source and image capture device may be arranged so that the document may be viewed prior to, concurrently with, and/or subsequent to having a classification code applied thereon. If the arrangement allows the document to be viewed prior to applying the classification code, this may advantageously allow the classification station to determine whether a classification code has already previously been applied to the document. If a classification code is already present on the document, the classification station may forego adding a new classification code to the document. In other embodiments, the classification station may proceed with adding the new classification code to the document. The classification station may add the new classification code to the document at a different location than the pre-existing classification code. For instance, if a pre-existing classification code exists at a first location, the classification code may add the new classification code at a different second location. The second location may be adjacent to the first location. The second location may be to the right, left, bottom, or top of the first location. In some embodiments, a document may have a primary location for applying the classification code. If the primary location already has a classification code applied thereon, a new classification code may be applied to one or more secondary locations different from the primary location. It may be desirable to check a primary location first whether a classification code is present, and only put the new classification code in the secondary location if the primary location is already occupied. In some embodiments, data from the pre-existing classification code may be read using OCR techniques. Information from the existing classification code may be useful in controlling future actions relating to the document. The information from the existing classification code may be associated with a digitized version of the document after the document is scanned.

When the arrangement to view the classification code is part of a scanning station, the light source and image capture device may be arranged so that the document may be viewed prior to, concurrently with, and/or subsequent to digitizing the document. In some embodiments, a scanning station may create a 'clean' digital version of the document which does not show the classification code, and a 'marked up' digital version of the document that does show the classification code. The marked up version of the document may show only the classification code, or may show both the classification code and the other information stored on the document. In some instances, the clean version and the marked up version may be overlaid to create a digital image of the document page that also shows the classification code, and/or separated so that the clean version of the document page is visible. The image capture device used to create the clean digital version and the image capture device used in the arrangement to create the marked up digital version of the document may be the same camera or different cameras. The support structure used to support the document may be the same for imaging for the clean version and the marked up version, or may be different support structures. The document may or may not be moved between imaging for the clean version and the marked up version. In some instances, the document may be moved with aid of the support structure. The document may be moved in an automated fashion without requiring human intervention.

A physical document 410 may be provided to the arrangement for viewing the classification code. The physical document may include one or more pages. In some embodiments, a single page may be presented at a time, or multiple pages may be presented at a time. A single document may be presented at a time or multiple documents may be presented at a time. The arrangement may receive one or more pages of one or more physical documents in an automated fashion. As previously described, the one or more pages may be of the same media time or different media types, the same dimensions or different dimensions, the same orientation or different orientations. The physical document may be brought to a desired location and/or alignment in the arrangement. The physical document may or may not have a fastener connecting multiple pages of the document when received at the arrangement to view the classification code. Optionally, if a fastener is provided, the fastener may be removed before the physical document is imaged and a digital version of the document is formed.

In some embodiments, the arrangement may include a support structure 420 that may support the physical document. The support structure may hold the document while an image of the physical document including the classification code is being captured. In some embodiments, the support structure may aid in moving the physical document to a desired location and/or alignment. For example, the support structure may comprise a conveyer belt and/or a robotic arm that may aid in manipulating the physical document. Alternatively, the support structure may be stationary and may be configured to receive the document that may be manipulated to the support structure manually or with aid of robotic features. The support structure may utilize gravity and/or friction in supporting the physical document. The support structure may optionally use positive or negative pressure in supporting the physical document. For example, the support structure may use suction in supporting the physical document. If the arrangement is part of a station, the support structure for the arrangement may be the same as the support structure for supporting the document while performing other functions at the station, or may be a different support structure.

The arrangement may cause a digital version image of the classification code to be captured. The digital image of the classification code may include an image of the rest of the document, or may include the classification code without the entirety of the document. An image capture device 430 may aid in creating the digital version of the classification code. Any description herein of the image capture device may apply to any type of device that may aid in creating a digital version of the classification code, whether it employs scanning techniques, or captures the entire image contemporaneously. Any imaging techniques described elsewhere herein for creating a digital version of the document may also apply to creating an image of the classification code on the document. Any description herein of the document may apply to a single page of the document or multiple pages of the document.

In some embodiments, the document may have material on a single side of each page. Alternatively, the document may be double sided. The classification code on a single side of each document page. Alternatively, the classification code may be on each side of the document page. A support structure or any other structure within the scanning station may aid in manipulating the physical document pages to allow both sides of the document to be imaged when the document is double sided. For example, a structure within the scanning station may cause the document to be flipped in an automated fashion to enable imaging of both sides of the document page. For example, a document page may be received at a scanning station with a first side up. A classification code on the first side of the document may be imaged. Then document may be flipped (e.g., in an automated fashion without requiring human intervention) so that the second side is up. A classification code on the second side of the document may be imaged.

A light source 440 may be part of the arrangement to image the classification code. Any description herein of capturing an image of the classification code may apply to capturing images of the classification code without capturing legible images of the rest of the document page, or may include capturing an image of the classification code and the rest of the document page to which the classification code is applied.

The light source may emit electromagnetic energy having wavelengths outside natural light. Energy from the light source may include light having wavelengths outside the visible spectrum. The light source may emit light having wavelengths below 400 nm or any other wavelength value described elsewhere herein. The light source may emit light having wavelengths above 700 nm or any other wavelength value described elsewhere herein. The image of the classification code may be captured using UV, FR, or IR radiation. Light in the visible range may or may not also be applied to the document. The light from the light source may be a stimulation light that may cause the ink used to create the classification code to fluoresce. In some embodiments, a filter may be applied to the light source that may permit only selected wavelengths of light to pass through. A filter may be provided anywhere within an optical path between the light source and the classification code.

In some embodiments, the classification code may be imaged, and may appear as a visible color. The color at which the classification code may be imaged may be the same or different from the color of the underlying material of the document. Light from the light source may cause the classification code to become visible at the visible color.

The light source may be substantially stationary or may be movable relative to the document. The light source may or may not move while imaging the classification code. A single light source or a plurality of light sources may be provided. In some embodiments, the plurality of light sources may emit light having different wavelengths from one another. The wavelengths of the plurality of light sources may or may not overlap. Light sources may be selectively turned on or off to image the document with and/or without the classification code.

In some embodiments, information relating to the classification code may be associated with the document. The information relating to the classification code may be associated with the digitized version of the document in a memory. The information relating to the classification code may be provided from the classification code which used the information relating to the classification code to control the printer to print the classification code. Alternatively or in addition, information relating to the classification code may be collected from the classification code on the physical document. For example, the physical document may be illuminated under light outside the visible spectrum and an image of the classification code may be captured. Optical character recognition (OCR) techniques may be employed to obtain the information relating to the classification code.

A controller may be in communication with one or more components of the arrangement to image the classification code. The controller may communicate with the support system 420, the image capture device 430, and/or the light source 440. The controller may comprise one or more processors that may obtain data and/or generate instructions to control the support system, the image capture device, and/or the light source. The controller may comprise memory comprising tangible computer readable media which may comprise code, logic, or instructions for performing one or more steps described elsewhere herein. The one or more processors may execute the one or more steps.

The controller may optionally control the support system, the image capture device, and/or the light source in concert. In one example, the controller may receive information from the support structure about placement of the document, which may be useful in controlling the image capture device. The controller may receive information from one or more of the support structure, the image capture device, and/or the light source that may be useful for controlling the support structure, the image capture device, the light source, or any other part of the scanning station.

An arrangement to image the classification code may or may not include a housing. The housing may partially or completely enclose one or more component of the arrangement. For example, the housing may partially or completely enclose the document while the classification code is being imaged. The housing may partially or completely enclose the image capture device and/or light source. The housing may be a housing of a classification station or a scanning station, or may be separate from a housing of the classification station or scanning station.

Figure 5:
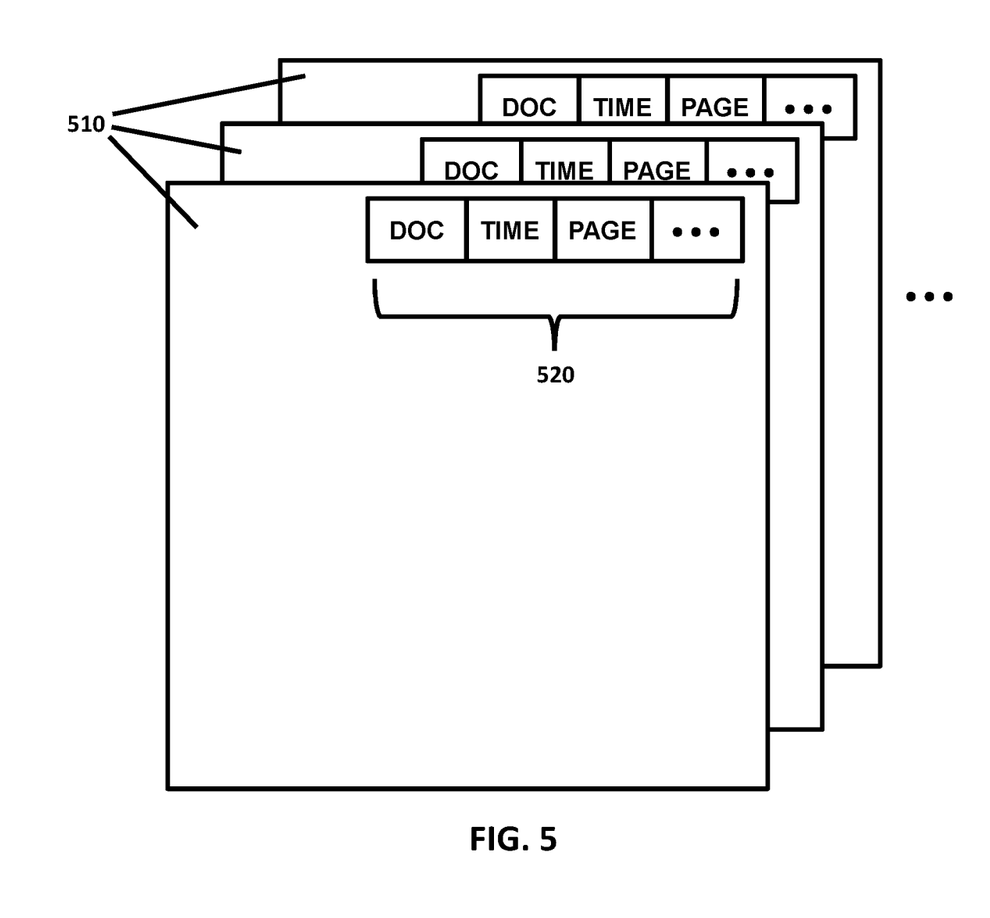
FIG. 5 shows a schematic of a classification code on a document in accordance with an embodiment of the invention.

FIG. 5 shows a schematic of a classification code 520 on a document 510 in accordance with an embodiment of the invention. The classification code may be added to the document using invisible ink. The classification code may not be visible on the physical document to the unaided eye when viewed under natural illumination. The classification code may not be visible to the unaided eye when viewed in sunlight, or conventional incandescent bulbs.

A classification code 520 may be applied to a physical document 510. The physical document may include one or more pages. In some embodiments, a single page may be presented at a time, or multiple pages may be presented at a time. A single document may be presented at a time or multiple documents may be presented at a time. One or more pages may be of the same media time or different media types, the same dimensions or different dimensions, the same orientation or different orientations. The physical document may or may not have a fastener connecting multiple pages of the document when received at the scanning station. Optionally, if a fastener is provided, the fastener may be removed.

The document may have material on a single side of each page. Alternatively, the document may be double sided. The classification code may be on a single side of each document page. Alternatively, the classification code may be on each side of the document page. The classification code may be provided at substantially the same location on each page of the document. For example, the classification code may be provided at the same corner or edge of each page of a document. In one example, the classification code may be provided at an upper right hand corner, lower right hand corner, lower left hand corner, upper left hand corner, top center, or bottom center of a document. Using invisible ink for the classification code may advantageously permit the classification code to printed on the document without regard to the location of the underlying material. For example, the classification code may always be printed on the bottom center of the document, regardless of whether there is already material at the bottom center of the document, since the document may be digitized or viewed without the classification code obscuring the underlying material. In other embodiments, the classification code may be printed on different locations of the pages of the document.

The classification code 520 may include information that may be uniquely identify the document and/or the page of the document. Optionally, each document may have a different classification code. In some examples, each page of the document may have a different classification code.

In one example, a portion of the classification code may be used to identify the document ("DOC"). Each document may have a unique document identifier. The document identifier may be a document number, document name, alphanumeric string, phrase, symbol, icon, or any other unique identifier for a document.

A portion of the classification code may be used to identify a page of a document ("PAGE"). Each page may have a unique page identifier. The page identifier may be a page number, name, alphanumeric string, phrase, symbol, icon, or any other unique identifier for a page of the document. In some embodiments, the page identifier may be the same for corresponding pages across different documents (e.g., DOC 1 may have a page identifier of 1 for the first page, and DOC 2 may also have a page identifier of 1 for the first page). In such situations, the classification code may differ for the different documents based on other portions of the classification code (e.g., DOC 1 may have a classification code DOC1NAME_Page1; DOC 2 may have a classification code DOC2NAME_Page 1). Alternatively, the page identifier may be different for corresponding pages across different documents.

The classification code may include timing information ("TIME") related to an event associated with the document. The timing information may be a portion of the classification code. For example, the event associated with the document may include a time at which the document is received at the classification and digitization system, a time at which the document is received by the classification station, a time at which a human manually provides the document to an automated system, a time at which the classification code is printed on the document, or a time at which the classification code is printed on each page of the document. Each page of the document may have the same timing information for its corresponding classification code. Alternatively, different pages of the document may have different timing information for their corresponding classification codes. The time may have any order of specificity. For example, the timing information may be expressed in years, months, date, day of the week, hour, minute, seconds, tenths of seconds, hundredths of seconds, and/or milliseconds. The timing may or may not include an indicator of time zone at the location where the classification code is applied. The timing information may optionally be provided with aid of a local clock at the classification and digitization system. The clock may be provided at the classification system. Alternatively, the timing information may be provided with aid of an external time keeping device off-board the system that may communicate with the system.

The classification code may include location information related to an event associated with the document. The location information may be a portion of the classification code. For example, the event associated with the document may include a location at which the document is received at the classification and digitization system, a location at which the document is received by the classification station, a location at which a human manually provides the document to an automated system, a location at which the classification code is printed on the document, or a location at which the classification code is printed on each page of the document. Each page of the document may have the same location information for its corresponding classification code. The location may have any order of specificity. For example, the location information may be expressed as a continent, country, state, province, city, town, street address, facility name, property name, or global coordinates (e.g., latitude, longitude). The location information may be reflective of a name or identifier of a document classification and digitization system. The location information may be precise to within 100 miles, 10 miles, 3 miles, 1 mile, 800 yards, 400 yards, 100 yards, 50 yards, 10 yards, 5 yards, 1 yard, 2 feet, 1 foot, or 1 inch. The location information may be provided with aid of a geo-location device at the classification and digitization system. A geo-location device may optionally be provided at a classification system. Global positioning system (GPS)

data may be used to provide location information. Alternatively, location information may be manually programmed into the system, and applied to the classification code.

The classification code may include information about an author of the document. The classification code may include information about a source of the document (e.g., storage box from which the document came, or company that provided the document to the system). The classification code may include information about a case or firm that the document is associated with. The classification code may include randomized information. The classification code may include an image or logo. The classification code may include a bar code, such as a 1D or 2D bar code. The classification code may form a watermark on the document.

One or more portions of the classification code may be combined to create the totality of the classification code. The totality of classification code may be generated with aid of one or processors. Information relating to the document and other factors as previously described may be used to generate the classification code. The portions of the classification code may include different types of information. The portions of the classification code may be arranged adjacent to one another. The portions of the classification code may be arranged in a repeated manner across different documents. For example, a document identifier portion may appear to the left of the document page portion for various documents. The timing portion may appear below the document page portion for various documents.

The classification code may follow a Bates coding format. The Bates coding (a.k.a. Bates number) system may optionally provide identifying numbers and/or date/time-marks on documents as they are scanned or processed. For example, the identifying markers may be provided during a discovery stage of preparations for a trial, or when identifying business receipts. The Bates coding may be useful to mark and identify materials with copyrights, or by putting a company name, logo, and/or legal copyright thereon. The bates coding may provide identification, protection, and/or automatic consecutive numbering of pages.

The classification code may be useful for legal documents that may need to be precisely identified. For example, the coding may be useful for litigation where unique numbers for each page are referenced through a trial and possible appeals that may span decades.

The classification code may be applied using an invisible ink. The classification code may be viewable under selected types of light. The classification code may be printed within enough precision that the various portions of the classification code are legible. The information from the classification code may be extracted and recognized.

Marking the physical documents with a classification code that is not viewable to the unaided eye under natural illumination allows the document to be marked with information without obscuring the material under the classification code. This is useful when digitizing the documents, because the digital versions of the documents may remain 'clean' and legible. This may also be useful when viewing the physical document, which may also remain legible. The information from the classification code may be viewable under selected types of illumination, or with aid of a filter or suitable imaging system, which may allow the information on the classification code to become viewable when desired. Having the classification code on the physical documents may aid in sorting, finding, authenticating, and storing documents.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents.

What is claimed is:

1. A method of document classification, said method comprising:
    receiving, at a classification station, a physical document comprising one or more pages;
    applying, at the classification station, a classification code to the physical document, wherein the classification code is formed using an ink that is (1) not visible to the unaided eye when viewed under natural light and (2) visible when illuminated by wavelengths outside the visible spectrum, wherein the classification code is applied to the physical document prior to scanning;
    scanning, with aid of an image capture device, the physical document into one or more images of the one or more pages of the physical document in a digital format, wherein the classification code is not visible in the one or more images of the one or more pages of the physical document;
    scanning the classification code under illumination of wavelengths outside the visible spectrum;
    associating the classification code to the digital format of the physical document without having the classification code visible in the one or more images; and
    storing both (i) the digital format of the physical document digitally associated with the classification code, wherein the classification code is not visible in the one or more images of the physical document, and (ii) the physical document physically associated with the classification code, wherein the classification code is not visible under natural light but capable of being identified under illumination of the wavelengths outside the visible spectrum for future processing of the physical document.

2. The method of claim 1, wherein information from the classification code includes one or more of the following: a unique identifier for each of the one or more pages, timing at which the classification code is applied to the physical document, or timing at which the physical document is received at the classification station.

3. The method of claim 1, wherein the physical document is formed of one or more members selected from the group consisting of: card stock, file folders, cardboard, acetate film, polyester film, synthetic paper, microfiche, tissue paper, X-ray film, blueprints, maps, cloth, and parchment.

4. The method of claim 1, wherein the ink is an ultraviolet ink that is visible when viewed under ultraviolet light.

5. The method of claim 1, wherein the classification code is applied with aid of an ink jet printer.

6. The method of claim 1, wherein the classification code follows a Bates numbering system.

7. An assembly for document digitization and classification, said assembly comprising:
- a classification station configured to (1) receive a physical document comprising one or more pages, and (2) apply a classification code to the physical document, wherein the classification code is formed using an ink that is (i) not visible to the unaided eye when viewed under natural light and (ii) visible when illuminated by wavelengths outside the visible spectrum, wherein the classification code is applied to the physical document prior to scanning;
- a scanning station comprising an image capture device configured to (1) scan the classification code under illumination of wavelengths outside the visible spectrum and (2) scan the physical document into one or more images of the one or more pages of the physical document in a digital format, wherein the classification code is not visible in the one or more images of the one or more pages of the physical document; and
- a processor configured to associate the classification code to the digital format of the physical document without having the classification code visible in the one or more images, thereby storing both (i) the digital format of the physical document digitally associated with the classification code, wherein the classification code is not visible in the one or more images of the physical document, and (ii) the physical document physically associated with the classification code, wherein the classification code is not visible under natural light but capable of being identified under illumination of the wavelengths outside the visible spectrum for future processing of the physical document.

8. The assembly of claim 7, further comprising a conveyance mechanism that permits the physical document to be conveyed from the classification station to the scanning station without human intervention.

9. The assembly of claim 8, wherein the classification station, the scanning station, and the conveyance mechanism operate in concert without human intervention.

10. The assembly of claim 7, wherein the classification station or the scanning station is configured to accommodate a plurality of types of physical documents without human intervention, wherein the plurality of types of physical documents include two or more members selected from the group consisting of: card stock, file folders, cardboard, acetate film, polyester film, synthetic paper, microfiche, tissue paper, X-ray film, blueprints, maps, cloth, and parchment.

11. The assembly of claim 7, further comprising a clock, wherein information from the classification code comprises timing information provided by the clock.

12. The assembly of claim 7, further comprising an illumination source that illuminates the physical document under light that includes wavelengths outside the visible spectrum, wherein the classification station applies the classification code to the physical document after the illumination source illuminates the physical document when illumination by the illumination source reveals that the physical document does not already have, applied thereon, a classification code formed of the ink that is not visible to the unaided eye.

13. A method of document classification, said method comprising:
- receiving, at a classification station, a physical document comprising one or more pages;
- applying, at the classification station, a classification code to the physical document, wherein the classification code is formed using an ink that is (1) not visible to the unaided eye when viewed with natural light illumination and (2) visible when illuminated by wavelengths outside the visible spectrum, wherein the classification code is applied to the physical document prior to scanning, and wherein the classification code includes timing information relating to an event associated with the physical document;
- scanning, with aid of an image capture device, the physical document into one or more images of the one or more pages of the physical document in a digital format;
- scanning the classification code under illumination of wavelengths outside the visible spectrum;
- associating the classification code to the digital format of the physical document; and
- storing both (i) the digital format of the physical document digitally associated with the classification code, and (ii) the physical document physically associated with the classification code.

14. The method of claim 13, wherein the event associated with the physical document is when the physical document is received at the classification station.

15. The method of claim 13, wherein the event associated with the physical document is when the classification code is applied to the physical document.

16. The method of claim 13, wherein the timing information has a degree of precision that is greater than or equal to a minute of precision.

17. The method of claim 13, wherein the classification code follows a Bates numbering system.

18. The method of claim 13, wherein the classification code is applied to each of the one or more pages of the physical document.

* * * * *